Oct. 8, 1957  M. CLAPP  2,808,872
TIRE RECAPPING MACHINE
Filed Sept. 27, 1954  4 Sheets-Sheet 1

INVENTOR.
MAURICE CLAPP
BY Lyon & Lyon
ATTORNEYS

Oct. 8, 1957  M. CLAPP  2,808,872
TIRE RECAPPING MACHINE
Filed Sept. 27, 1954  4 Sheets-Sheet 2
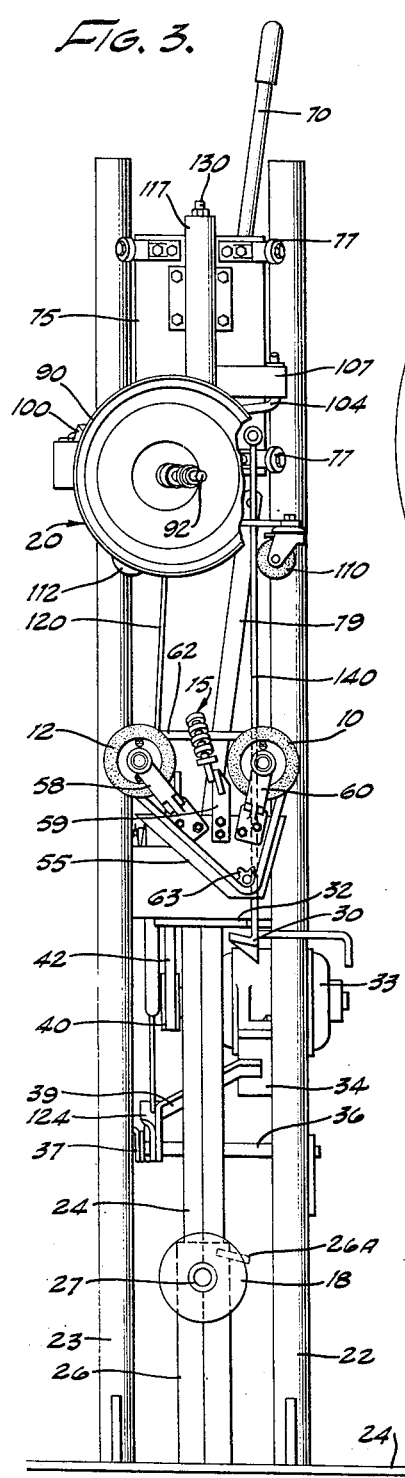
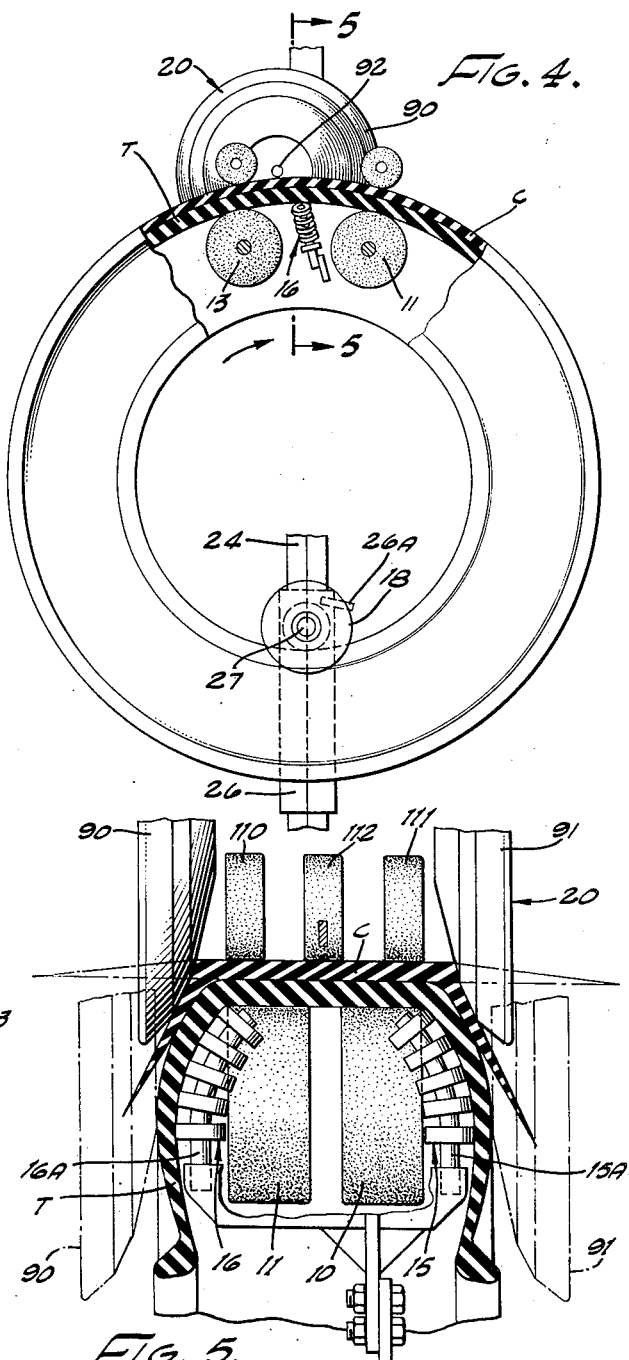
INVENTOR.
MAURICE CLAPP
BY
Lyon & Lyon
ATTORNEYS Oct. 8, 1957 M. CLAPP 2,808,872
TIRE RECAPPING MACHINE
Filed Sept. 27, 1954 4 Sheets-Sheet 3
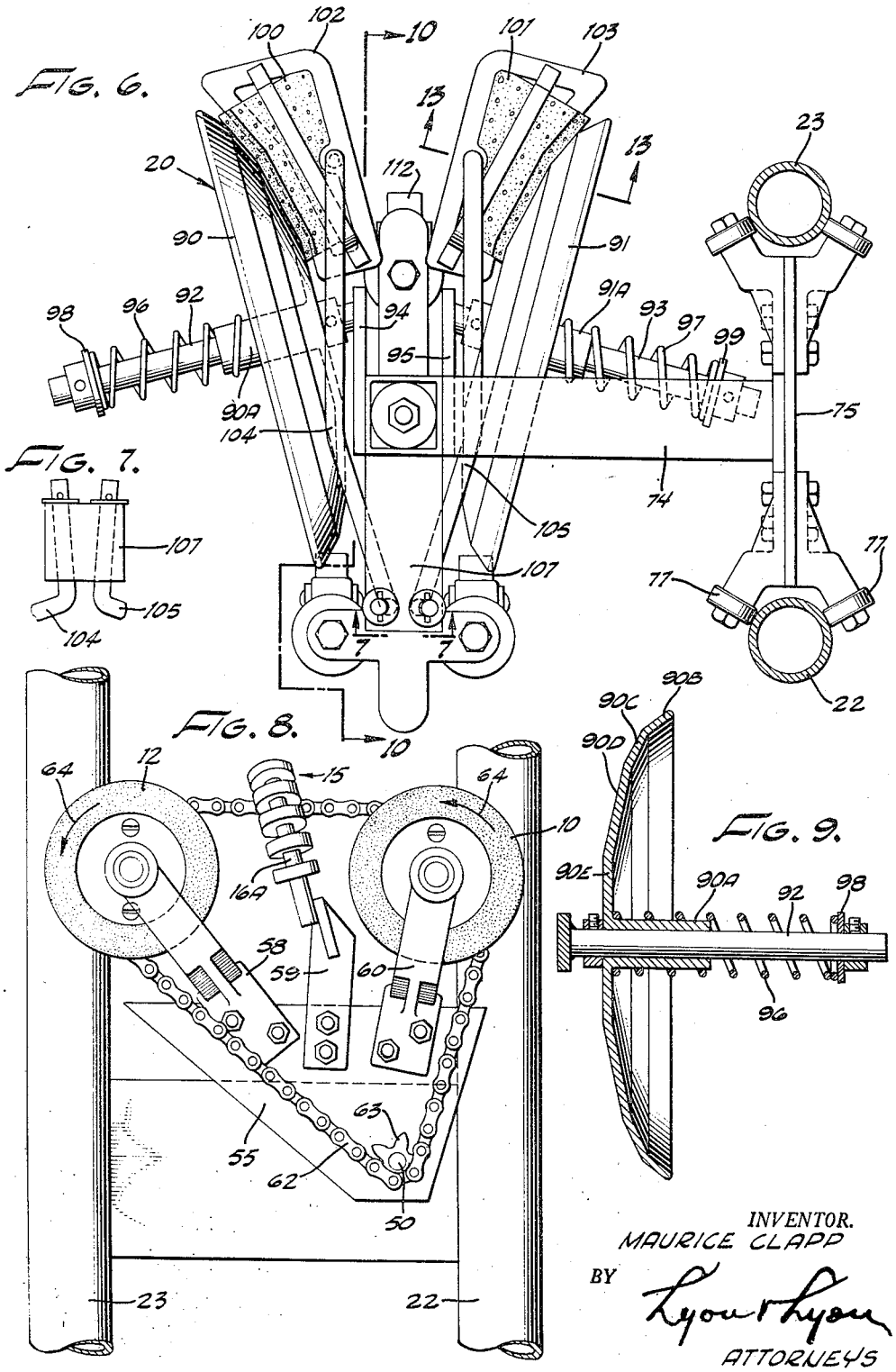
INVENTOR.
MAURICE CLAPP
BY
Lyon & Lyon
ATTORNEYS

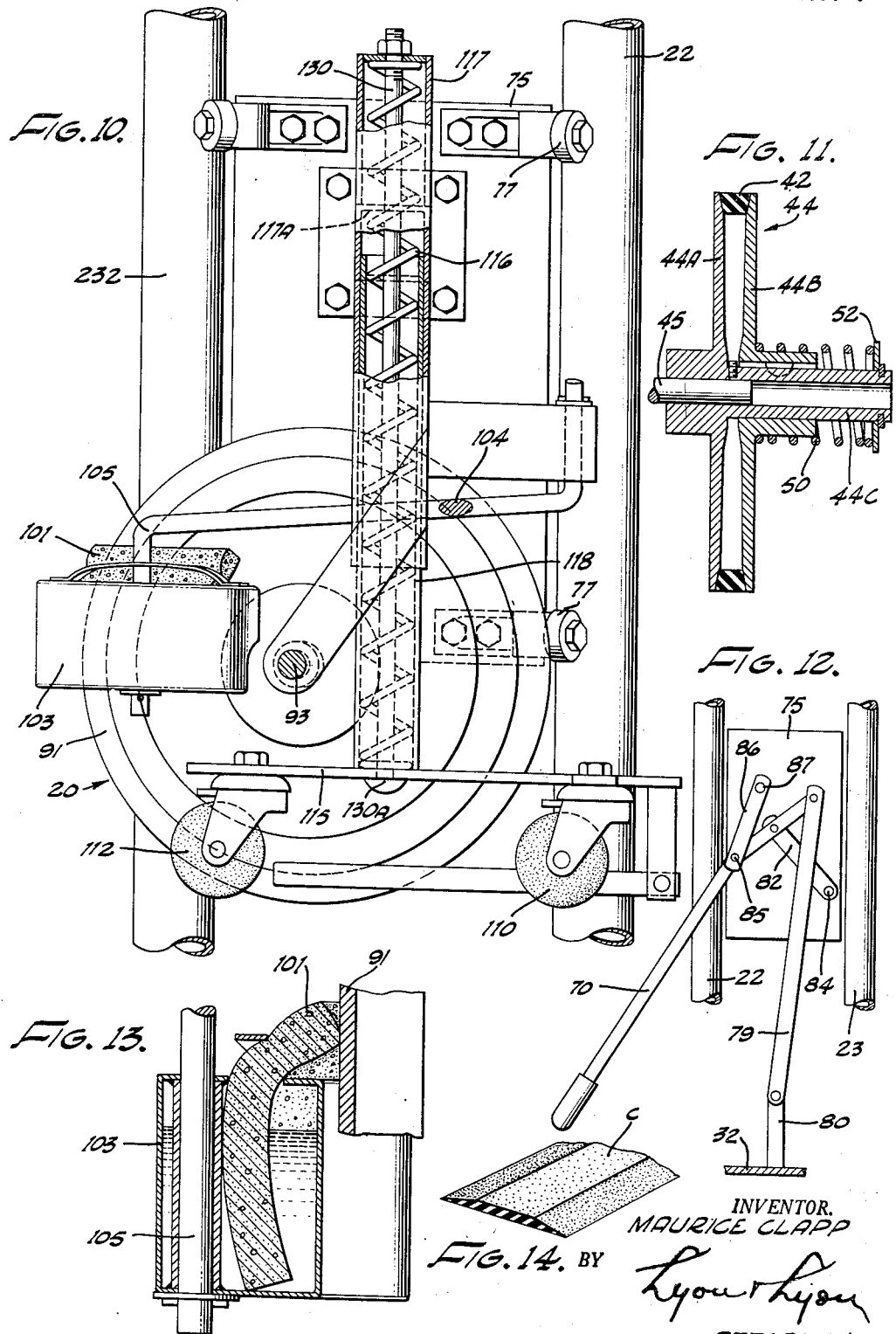

United States Patent Office 2,808,872
Patented Oct. 8, 1957

2,808,872

TIRE RECAPPING MACHINE

Maurice Clapp, Redlands, Calif.

Application September 27, 1954, Serial No. 458,427

2 Claims. (Cl. 154—9)

The present invention relates to improved means and techniques for use in machines for recapping tires.

Briefly, the present invention contemplates a tire recapping machine serving to apply new rubber strip to a tire carcass. For that purpose, the machine incorporates a motor that drives four rollers. These rollers are disposed inside the tire so as to rotate the same with the spaced beads of the carcass engaging an idler or guide roller. A series of roller bearings is mounted on arcuate shaped spindles to provide support for the side walls of the tire during the recapping operation. After the tire is mounted, as indicated above, a head assembly of the machine is lowered to engage the upper surface of the new rubber, such head including three caster wheels which serve essentially to hold the central portion of the new rubber in place while the side portions are kneaded to the outer wall of the tire by generally conical discs that are normally biased upwardly towards each other by compression springs. As the tire is moved, these discs, which are toed in, are effectively cammed outwardly by the tire with increased force, however, being applied to the new rubber.

The features of this machine is that it is capable of handling various sized tires satisfactorily because of the movability of the aforementioned aluminum discs. For these general purposes, each disc has four degrees of taper.

It is therefore an object of the present invention to provide an improved machine constructed and operating as indicated above.

A specific object of the present invention is to provide a machine of this character which is capable of handling various sized tires.

Another specific object of the present invention is to provide a machine of this character which is relatively simple, inexpensive, and easy to operate.

Another specific object of the present invention is to provide a tire recapping machine having a pair of cocked discs that functions in a novel manner to place camelback on tire carcasses in a more uniform manner than has heretofore been possible.

Another specific object of the present invention is to provide an improved machine of this character incorporating a novel tire driving structure.

Another specific object of the present invention is to provide a machine of this character having a novel mandrel which is independent of the driving mechanism.

Another specific object of the present invention is to provide a machine of this character in which the wind portion of camelback is continuously crowded against the side wall of a tire carcass to avoid the appearance of noticeable folds.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 3 is still another elevational view taken generally as indicated by the line 3—3 in Figure 1.

Figure 4 illustrates a portion of the machine illustrated in Figure 1 in the process of applying a new rubber strip to a tire carcass.

Figure 5 indicates generally a sectional view taken substantially on the line 5—5 of Figure 4.

Figure 1:
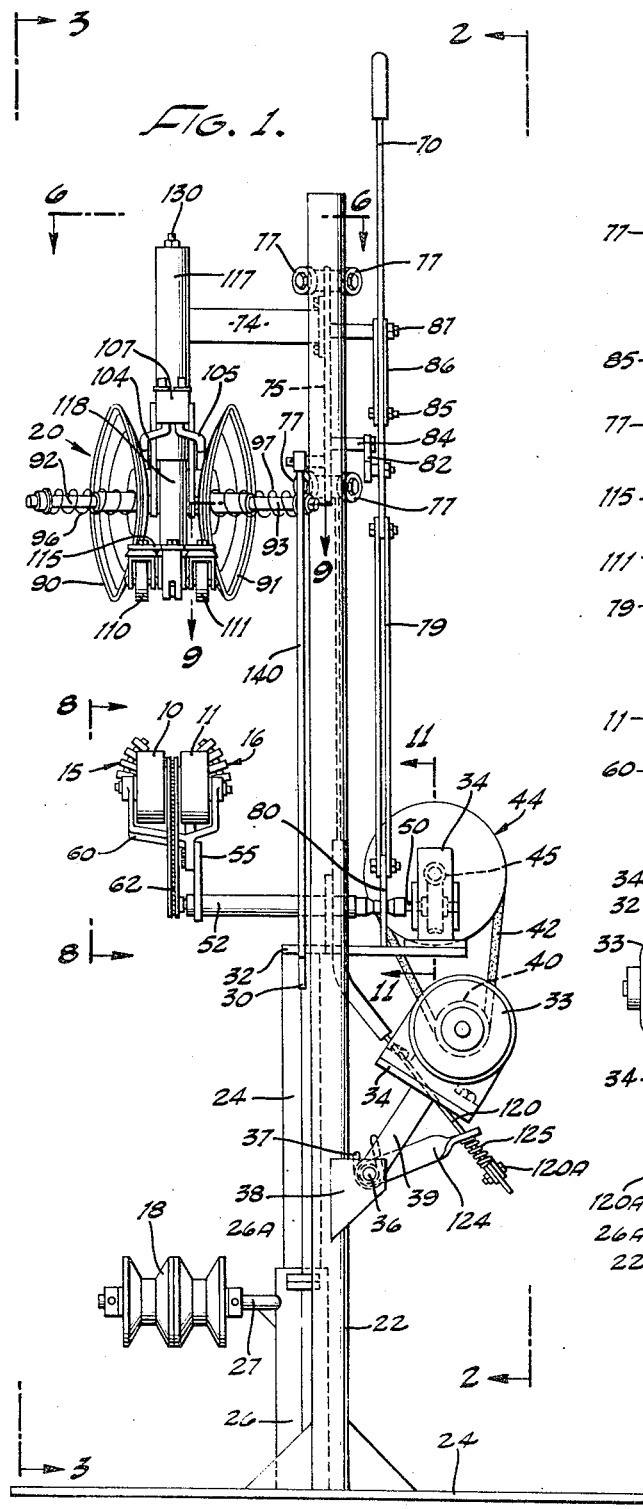
Figure 1 illustrates a view in front elevation of a machine embodying features of the present invention.

Figure 6 is a view taken generally on the line 6—6 of Figure 1.

Figure 7 is a view taken generally on the line 7—7 of Figure 6.

Figure 8 is a view taken generally in a direction indicated by the lines 8—8 in Figure 1.

Figure 9 is a sectional view taken substantially on the line 9—9 of Figure 1.

Figure 10 is a sectional view taken substantially on the line 10—10 of Figure 6.

Figure 11 is a sectional view taken substantially on the line 11—11 of Figure 1.

Figure 12 illustrates a view in side elevation of linkage for producing relative movement of different elements of the machine illustrated in Figure 1.

Figure 13 illustrates a sectional view taken substantially on the line 13—13 of Figure 6.

Figure 14 is a perspective view illustrating flat strip type of camelback before it is applied to the tire carcass.

The machine described herein is intended to apply a new tread in the form of conventional camelback to a suitably prepared tire carcass which may be of any one particular size in a relatively large range of sizes.

For these purposes, the machine includes generally means for supporting and rotating the tire carcass in the form of four motor-driven rollers, 10, 11, 12, and 13, two series of ball bearing supporting elements 15, 16, all of which are engageable with the internal portion of the tire carcass T as illustrated in Figure 5; and, this particular tire supporting and rotating means, preferably includes guide means in the form of a pulley 18 engageable with the bead of the tire carcass as illustrated in Figure 4. Also, the machine incorporates means for applying pressure to the camelback C in the form of an adjustable head 20 that serves to press the camelback C into bonding engagement with the tire carcass as illustrated in Figure 5.

In the following description, the means for supporting and rotating the tire carcass is first described and then details of the adjustable head 20 are then described.

The means for rotating and supporting the tire carcass includes, more specifically, a pedestal 24 from which extend upwardly three vertical mounting members, namely, a pair of vertical tubular columns 22 and 23 and vertically extending square cross-sectioned tubing 24. This central supporting post 24 has telescoped over it for sliding movement, tubing 26, upon which is mounted the horizontally extending shaft 27, such shaft 27 rotatably supporting the aforementioned guide roller 18. By these means guide roller 18, besides being rotatable, is movable vertically to accommodate different sized tires. The slidable tubing 26 has an extension 26A in the form of a small flat metal plate that cooperates with a hook 30 in the manner and for the purposes described, later.

Figure 2:
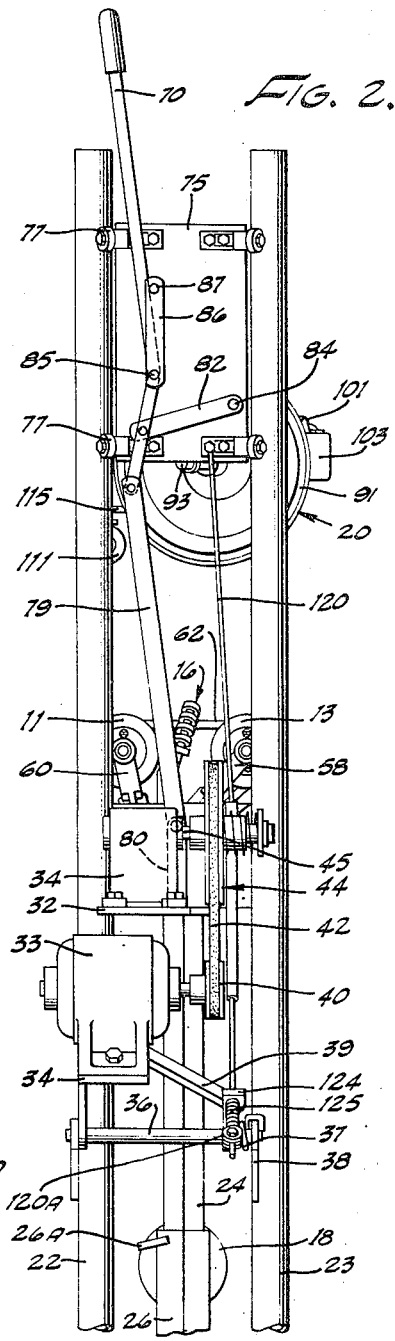
Figure 2 is another elevational view taken generally as indicated by the line 2—2 in Figure 1.

These supporting members 22, 23, 24 have mounted thereon a horizontally extending shelf 32 which serves as a support for a gear box 34. The supporting members 32 and 33 as illustrated in Figures 1 and 2, serve also to support the driving motor 33 which is mounted on the base 34, such base 34 being pivotally mounted about a horizontal axis on the columns 22 and 23, using means which include the supporting shaft 36.

The motor 33 is thus biased downwardly in a clockwise direction by gravity forces acting thereon as well as by the torsion spring 37 which is wound around the shaft 36 with one end thereof engaging the bracket 38 and the other end engaging the motor supporting arm 39.

The motor 33 has a pulley 40 on its output shaft over which the driving belt 42 passes to drive the adjustable ratio pulley 44 mounted on the input shaft 45 of the gear box 34. Details of this adjustable ratio pulley 44 are illustrated in Figure 11. As shown, the pulley 44 comprises two flared discs 44A and 44B which are normally biased towards each other by a prestressed coil compression spring 50 having one of its ends engaging the disc 44B and the other one of its ends engaging the retaining washer 52 disposed on the extended hub 44C. The pulley 44B is slidably mounted on such hub 44C. Thus, the driving belt 42 is allowed to move between the spring biased discs 44A and 44B, in an amount depending upon the tension on the belt 42 so as to effect a different, but variable driving ratio. By these means, the output shaft 50 of the gear box 34 is driven.

This shaft 50 extends through an elongated horizontal sleeve 52 that is secured to the vertical supporting columns 22 and 23. This sleeve 52 besides serving as an elongated bearing for the output shaft 50 serves also as a mounting for the tire engaging elements 10, 11, 12, 13, 15, and 16.

For this purpose a bracket 55 extends upwardly from the sleeve 52, for in turn, supporting auxiliary bracket elements 58 and 59 and 60 that rotatably support respectively, rollers 12 and 13, the ball bearing supporting elements 15 and 16, and the rollers 10 and 11.

These tire engaging rollers 10, 11, 12, and 13 are each driven by a common sprocket chain 62 that is driven by a sprocket wheel 63 mounted on the shaft 50. The direction of sprocket travel is such as to cause the wheels 10 and 12 to rotate in the counterclockwise direction as indicated by the arrows 64 in Figure 8.

These rollers 10, 11, 12, and 13 engage essentially the underside of the crown of the tire carcass while the ball bearing elements comprising the members 15 and 16 engage opposite side walls of the tire carcass as illustrated in Figure 5. For that purpose, the members 15 and 16 each comprise a series of conventional ball bearings having their inner race members mounted on curved cantilever supporting rods 15A and 16A respectively, with the outer race of such ball bearing elements engaging the inner opposite side walls of the tire carcass. By these means the upper portion of the tire carcass, as it rotates, is rigidly supported for application of the camelback, using the head 20, the details and functioning of which is now described.

The camelback head 20 is adjustably supported for vertical positioning on the aforementioned vertical supporting columns 22 and 23.

In general, the head 20 is slidably mounted on the vertical supporting posts 22 and 23 and may be raised and lowered on such posts 22 and 23 using the manually operated lever 70 and connected linkage, which is illustrated in two different positions in Figures 2 and 12. This head 20 is mounted on a horizontally extending arm 74, which in turn, is secured to the plate 75, such plate 75, as shown in Figures 6 and 2, having four spaced rollers 77 engageable with the post 22 so that the head, as indicated above, may be guided while being moved with respect to such supporting posts 22 and 23. For purposes of moving such head 20 to different positions, the aforementioned lever handle 20 is slightly bent and has its extremity pin connected to one end of rod 79, which has its other end pin connected to the vertical bracket 80 attached to the stationary shelf 32. An intermediate point of the lever 70 is pin connected to one end of the link 82 which has its other end pivoted by means of pivot pin 84 on the plate 75. A second intermediate point of the lever 70, closer to the operating end of handle 70 is pin connected by means of pin 85 to one end of the lever 86 which has its other end pivoted on the plate 75 using the pivot pin 87. This linkage including the elements 70, 79, 80, 82, and 86 provides a means for raising and lowering the head 20 and due to its particular configuration provides a support for maintaining the head 20 in its raised position illustrated in Figures 1 and 2 without the necessity of the operator holding the handle 70. When the lever 70 is moved from its position shown in Figure 2 to the position illustrated in Figure 12, gravity forces acting on the head 20 causes the head 20 to gravitate downwardly in the direction of the tire carcass and in order to subsequently raise the same, it is necessary for the operator to rotate the handle from the position illustrated in Figure 12 to the position illustrated in Figure 2. The operator, when the handle is not in the position shown in Figure 12 (or near that position), may apply varying amounts of pressure to the head 20 depending upon the amount of force which he exerts on the handle 70; so that thus, the operator, if desired, may apply varying amounts of pressure between the camelback and the tire carcass.

The camelback engaging head 20 incorporates important features of the present invention involving the use of spring biased discs having different degrees of taper with the plane of such discs being skewed with respect to each other.

The head 20 includes the two spring biased specially shaped discs 90 and 91 that are rotatably supported on corresponding shafts 92 and 93 as illustrated in Figure 9. For this purpose, adjacent ends of the shafts 92 and 93 are secured to the brackets 94 and 95 which extend from the supporting arm 74, with the axes of such shafts 92 and 93 being, however, non coaxial and non parallel in so far as the vertical plane is concerned, i. e., that plane that extends perpendicular to the plane of the sheet of drawings that includes Figure 6. However, the axes of shafts 92 and 93 are each in the same horizontal plane as deduced from an inspection of Figure 1.

Each of these shafts 92 and 93 have disposed about them, corresponding prestressed coil compression springs 96 and 97 with adjacent ends of each engaging corresponding discs 90 and 91 and with opposite ends thereof engaging retaining washers 98 and 99, respectively, on shafts 92 and 93. These discs 90 and 91 are provided with elongated internal hubs 90A and 91A which allow these discs to rotate as well as slide on their corresponding supporting shafts 92 and 93, respectively.

Each of the discs 90 and 91, as illustrated in Figure 9, includes four annular flat portions as illustrated by the flat portions 90B, 90C, 90D, and 90E. It is observed that the portion 90E extends generally perpendicular to the axis of the supporting shaft 92 while the annular sections 90D and 90C and 90B that extend progressively away from such shaft 92 are inclined more and more with respect to the axis of the shaft 92.

This particular disposition and configuration of the discs 90 and 91 provides a tapered "mouth" into which the tire carcass with the camelback thereon is progressively moved so as to crowd or press with increasingly greater force the camelback into engagement with the tire carcass at the same time to produce a wiping action in a direction such that effectively the tapered ends of the camelback illustrated in Figure 5 are wiped radially inwardly and progressively as the tire with the camelback thereon rotates between the head 20 and the supporting structure. While the discs 90 and 91 are not directly motor driven, sufficient friction is developed between the camelback and these discs to cause them to rotate in accordance with motion of the tire carcass.

Preferably, these discs 90 and 91 are lubricated with water for the above-mentioned purposes and for that reason lubricating means including the water-soaked sponges 100 and 101 are provided.

These sponges 100 and 101 are disposed within reservoirs for housings 102 and 103 which are pivotally attached respectively to one end of arms 104 and 105. The extremity of these arms 104 and 105 are bent as illustrated in Figure 7 and are journalled in the stationary supporting bracket 107 in such a manner that the gravity force acting on the casings 102 and 103 serves to press the water-soaked sponges 100 and 101 into engagement with the discs 90 and 91 to lubricate the same.

These discs 90, 91 are essentially for pressing the side portions of the camelback into engagement with the side walls of the tire carcass; and the crown portion of the camelback is pressed into engagement with the corresponding crown portion of the tire carcass by different means involving spring biased rollers illustrated in Figures 5 and 10. These spring biased rollers, three in number, designated as rollers 110, 111, and 112 are each mounted on a common supporting base 115, which in turn, is spring biased downwardly by a prestressed coil compression spring 116 that is housed in a pair of telescoping sleeves 117 and 118. The outer sleeve 117 is secured to the mounting plate 75 while the internal sleeve 118 is secured to the mounting base 115. A singularly disposed elongated bolt 130 passes centrally through the telescoping sleeve and has its upper end affixed to the sleeve 118 and with its head 130A serving to limit downward movement of the base 115 and, of course, the rollers 110, 111, and 112. Upward movement of such rollers and base 115 is limited by engagement of the end of the inner sleeve 118 with an obstruction such as, for example, a pin or web member 117A extending transversely of the outer sleeve 117. These pressure rollers 110, 111, and 112 for engaging the crown portion of the camelback have as their counterpart, rollers 10, 11, 12, and 13 which are intended primarily to resist that force applied through the rollers 110, 111, and 112. On the other hand, the series of ball bearing members 15 and 16 which are disposed on the curved shafts 15A and 16A, and with the axes of the shafts displaced from the vertical as illustrated in Figure 8, serves essentially to resist that force applied by the discs 90 and 91.

Preferably, it is desired that the tire carcass be rotated at a relatively slow speed preparatory to engagement with the head 20; and then subsequently that the tire carcass, with the camelback thereon be rotated at a relatively high speed when the head 20 is in engagement with the camelback. For that purpose the speed of the driving mechanism is synchronized with movement of the head 20 in the following manner and this involves the use of the variable ratio pulley 44 illustrated in Figure 11 and described above.

The weight of the motor 33 is utilized to automatically adjust the ratio of the variable ratio pulley 44. Normally a substantial portion of the weight of the motor 33 is supported by the plate 75 through the interconnected flexible cable 120. The cable 120 has its upper end fastened to the plate 75 as illustrated in Figure 2 and its lower end passing through an aperture in the free end of the arm 124 which is integrally formed with the arm 39. The end of the flexible cable 120 carries an abutment 120A which serves to limit movement of the coil compression spring 125 having its other end engaging the arm 124 for rendering the control more smooth. By these means, lowering of the plate 75 (using the handle 70) results in a redistribution of the weight of the motor 33 such that more is applied to the driving pulley 45 to cause it to spread the spring biased discs 44A and 44B so as to allow the driving pulley 42 to move radially inwardly in the discs to cause the speed of the driven shaft 45 to increase. In other words, lowering of the head 20 causes automatically the speed of the driven shaft 45 to increase to in turn cause increased angular rotation of the tire carcass supported on the rollers 10, 11, 12, and 13.

Preferably, also, as a safety feature to avoid injury to, for example, the operator's foot, a catch 30 is provided on the end of the rod 140 having its upper end attached to the movable plate 75. The action is such that when the head 20 is lowered the hook 30, of course, follows such movement and the hook 30 moves sufficiently downwardly to move past the projection 26A on the movable sleeve 26, the arm 140 being sufficiently resilient to allow the hook 30 to move relative to the projection 26A when these two elements 26A and 30 are initially engaged. Subsequently, when the head 20 is raised (using the handle 70), the hook 30 engages the projection 26A to cause the sleeve 26 with the pulley 18 to move upwardly with the head 20, thereby raising the pulley 18 out of guiding engagement with the beads of the tire carcass so as to allow removal of the tire carcass; at the same time preventing pulley 18 from falling by gravity onto the operator's foot.

In the following description of the operation of the machine, it is assumed that initially the elements are as illustrated in Figure 1, with the pulley 18 in its downward position as illustrated. The operator then inserts the tire carcass over the driving rollers 10, 11, 12, and 13, raises the pulley 18, and then allows it to drop by gravity into its position illustrated in Figure 4. This may be accomplished with the motor 33 rotating, particularly since at this time, the ratio of the variable pulley 44 is such that the rollers 10, 11, 12, and 13 rotate at a relatively slow speed. Rotating at such relative slow speed the camelback may be pressed on the tire carcass, which is suitably prepared for that purpose, using conventional techniques, and then the head 20 is lowered, using the handle 70 for that purpose. Upon lowering the head 20 the speed of the driving posts 10, 11, 12, and 13 automatically increases due to the fact that the weight of the driving motor 33 is being redistributed in increased amounts to the driving pulley 45 to cause the pulley discs 43A and 43B (Figure 11) to separate. These rollers 10, 11, 12, and 13 are driven so that a particular portion of the camelback is crowded more and more, with a wiping action, into the side walls of the tire carcass, due to the particular configuration and angularity of the discs 90 and 91. The operator may apply varying pressures using the handle 70. The movement of the head 20 is generally a continuous process and approximately four revolutions of the tire are required to perform the operation, during which the head 20 is moved continuously downwardly. In such downward movement the hook 30 snaps past the projection 26A so that subsequently upon upward movement of the head 20 the pulley 18 is carried out of guiding engagement with the beads of the tire to facilitate removal of the tire with the camelback applied thereto.

It is noted that the curved roller bearing supporting elements 15 and 16 serve essentially as a mandril to resist the forces applied by the discs 90 and 91 during the time such discs are applying pressure to the opposite tapered winged portions of the camelback; and in this respect, it is observed that this mandril means is independent of the tire rotating means in accordance with a feature of the invention. Further, this mandrel means includes independent ball bearings, the outer race members of which rotate at different speeds with the outer ones rotating, of course, at a higher speed than the inner ones.

It is also observed that the discs 90 and 91, due to the engagement with the crown portion of the camelback, rotate at a speed determined substantially by the speed of the tire at the crown; and this means that the inner or peripheral portion of the discs that contact the wings of the camelback rotate at a higher speed. This means that the wing portions of the camelback and the peripheral edges of the discs move at different relative speeds to produce the desirable wiping action. By these means the wing portions of the camelback are subjected to a crowding action, and this is essential considering the fact that in recapping a tire having a normal size of 6.70 x 15, a flat strip of camelback having a length of approximately 95 inches is used. This means that when finished, the inner edge of the camelback defines a periphery having a circumference of 82 inches, namely, a circumference which is 13 inches less than the circumference at or near the crown. Such 13 inches is disposed in an unnoticeable way on the finished tire without scalps or noticeable folds. This is so since the wiping action is continuous and results in a thickened-up inner edge of the camelback without noticeable air space. The finished tire may be considered to have an infinite number of folds instead of a few folds that are noticeable.

With respect to Figure 9, it is observed that the flat portion 90E extends as indicated above perpendicular to the axis of the shaft 92, the portion 90D extends at an angle of approximately 15° with respect to the vertical. The portion 90C extends at an angle of 45°, all for the purpose of accommodating different size tires. Further, while the pulley illustrated in Figure 11 is described above as having variable ratio its ratio, as a matter of fact, may be changed from one value to a second value in a discontinuous manner when and as the belt 42 moves from engagement with the tire portion as illustrated in Figure 11 to a more inward portion. In other words, the tire driving means has essentially two speeds, namely, a slow speed prior to lowering of the head and a fast speed after the head is lowered.

Further, it is understood that while the machine is described as having a movable head 20 it is understood that the same functioning and results may be obtained if the head 20 were stationary and the tire driving and guide means were moved relative to such head 20. Further, it is understood that while the machine is described as having a manually operable handle 70, hydraulic means may be applied instead to produce relative movement between the head 20 and the tire driving means.

While the particular embodiments of the present invention have been shown and described, it will be obvious to those skilled in the art that changes and modificaitons may be made without departing from this invention in its broader aspects, and, therefore, the aim in the appended claims is to cover all such changes and modifications as fall within the true spirit and scope of this invention.

I claim:
1. In an arrangement of the character described, a frame, means rotatably mounted on said frame and engageable with the inner portion of a tire carcass to support and to rotate the same, a motor pivotally mounted on said frame, means including a variable ratio pulley interconnecting said motor with the last-mentioned means, the weight of said motor being partially supported by said pulley, and the ratio of said pulley being determined by the amount of weight applied from said motor to said pulley, a head movably mounted on said frame and engageable with said tire carcass, and means extending between said head and said motor for redistributing the weight of said motor to said pulley to effect a variable ratio in accordance with the position of said head.

2. In an arrangement of the character described a frame, a pair of rollers mounted on said frame and engageable with the inside crown portion of a tire carcass, means for driving said rollers, a pair of cantilever supported curved arms each having a plurality of ball bearings rotatably mounted on the corresponding arm for engagement with the inner portion of a corresponding side wall of the tire carcass, a head vertically adjustable on said frame, said head carrying a plurality of spring biased rollers engageable with the upper portion of the tire corresponding to the crown portion with the last-mentioned rollers being adapted to engage camelback applied to said tire carcass, said head comprising a pair of discs rotatable about axes which extend non parallel in the horizontal plane, means spring biasing said discs together while allowing rotation about said axes, said discs being positioned to engage the outer portions of opposite side walls of the tire so that such discs may press camelback onto said side walls with a wiping action.

References Cited in the file of this patent
UNITED STATES PATENTS

| | | |
|---|---|---|
| 2,464,020 | Breth | Mar. 8, 1949 |
| 2,490,445 | Kuffler | Dec. 6, 1949 |
| 2,498,953 | Glynn | Feb. 28, 1950 |
| 2,690,207 | Godfrey | Sept. 28, 1954 |
| 2,717,022 | Duerksen | Sept. 6, 1955 |